US007262730B2

(12) United States Patent
Larsson et al.

(10) Patent No.: US 7,262,730 B2
(45) Date of Patent: Aug. 28, 2007

(54) METHOD AND A STATION FOR ASSISTING THE CONTROL OF AN AIRCRAFT

(75) Inventors: Stefan Larsson, Linkoping (SE); Fredrik Oehmichen, Linkoping (SE); Carleric Weiland, Linkoping (SE)

(73) Assignee: Saab AB, Linköping (SE)

( * ) Notice: Subject to any disclaimer, the term of this patent is extended or adjusted under 35 U.S.C. 154(b) by 186 days.

(21) Appl. No.: 11/162,121

(22) Filed: Aug. 30, 2005

(65) Prior Publication Data

US 2006/0256000 A1 Nov. 16, 2006

(30) Foreign Application Priority Data

Aug. 31, 2004 (EP) .................................. 04020612

(51) Int. Cl.
*G01S 13/93* (2006.01)

(52) U.S. Cl. ............................ 342/29; 342/30; 342/63; 340/961; 701/301

(58) Field of Classification Search ............ 342/29-40, 342/63; 340/961; 701/301
See application file for complete search history.

(56) References Cited

U.S. PATENT DOCUMENTS

| | | | | |
|---|---|---|---|---|
| 4,839,658 | A | 6/1989 | Kathol et al. | |
| 5,157,615 | A | 10/1992 | Brodegard et al. | |
| 6,133,867 | A * | 10/2000 | Eberwine et al. | 342/29 |
| 6,201,482 | B1 * | 3/2001 | Schiefele et al. | 340/961 |
| 6,246,320 | B1 * | 6/2001 | Monroe | 340/506 |
| 6,483,454 | B1 * | 11/2002 | Torre et al. | 342/30 |
| 6,657,578 | B2 * | 12/2003 | Stayton et al. | 342/30 |
| 6,690,296 | B2 * | 2/2004 | Corwin et al. | 340/961 |
| 7,006,032 | B2 * | 2/2006 | King et al. | 342/29 |
| 2003/0025614 | A1 * | 2/2003 | Kahn | 340/961 |
| 2003/0122701 | A1 * | 7/2003 | Tran | 342/29 |
| 2003/0169185 | A1 * | 9/2003 | Taylor | 340/945 |
| 2006/0256000 | A1 * | 11/2006 | Larsson et al. | 342/30 |

FOREIGN PATENT DOCUMENTS

| | | | |
|---|---|---|---|
| EP | 1630764 | A1 * | 3/2006 |
| GB | 2373658 | A * | 9/2002 |
| WO | WO9845953 | A * | 10/1998 |
| WO | WO 2004/029902 | A | 4/2004 |

OTHER PUBLICATIONS

Pryor D: "Tcas Finally Moves into the Cockpit", Feb. 1, 1991, Aerospace America, American Institute of Aeronautics & Astronautics. New York, US.

* cited by examiner

*Primary Examiner*—John B. Sotomayor
(74) *Attorney, Agent, or Firm*—Albihns AB

(57) ABSTRACT

A station for assisting the control of an aircraft includes warning means (5) adapted to deliver an alert for avoiding a later collision when there is a risk that the predicted flight trajectory of the aircraft crosses any predicted flight path of another aircraft. An arrangement (4) is adapted to determine whether the aircraft carrying said station is within an airspace volume with defined geometrical dimensions and time of appearance and disappearance or not and make the function of the warning means dependent upon this comparison by, when located in said airspace volume, deactivating said warning means with respect to other aircraft of a predefined identity, and when not located in said airspace volume, activate or keep the function of said warning means activated with respect to aircraft of said predefined identity. (FIG. 1).

26 Claims, 2 Drawing Sheets

METHOD AND A STATION FOR ASSISTING THE CONTROL OF AN AIRCRAFT

TECHNICAL FIELD OF THE INVENTION

The present invention relates to a method and a station for assisting the control of an aircraft according to the preambles of appended independent method and station claim.

BACKGROUND OF THE INVENTION

"Aircraft" may be any type of manned aircraft and unmanned aircraft, such as so-called unmanned air vehicles or unmanned combat vehicles being autonomous but possibly also partially controllable from the ground. In the case of a manned aircraft it may be a civilian aircraft, but the invention is particularly directed to military aircraft, so that particular application will hereinafter be described for illuminating the invention but accordingly not restricting the scope thereof.

All aircraft, civilian as well as military, have a transponder continuously broadcasting data associated with the position, the velocity and the identity of the aircraft and receiving corresponding data from other aircraft. Accordingly, said transmitter and receiver are then present in the form of such a transponder.

The aircraft have also a so-called de-conflicting system for avoiding mid-air collisions, i.e. collisions between two or more aircraft. The most common such system is the TCAS system (traffic collision avoiding system). This system involves a processing of said transponder data for calculating through the on board computer of the aircraft whether there is a risk that the predicted flight trajectory of the aircraft cross any predicted flight path of another aircraft. When it is determined that such a risk exists a warning means delivers an alert for avoiding a later collision. This means in the case of a manned aircraft that the pilot in the respective aircraft may then without coming under time pressure change the flight path for avoiding a collision. This calculation is carried out by a simple tracking algorithm requiring comparatively limited computer capacity. In the case of an unmanned aircraft a modified flight path may automatically be selected upon such an alert indicating the risk of a later collision.

Known are also so-called automatic collision avoiding systems (ACAS) designed to be the last protection against mid-air collisions between two or more aircraft. Such systems are adapted to select an automatic so-called fly-out of the aircraft for avoiding a collision with another aircraft coming close thereto. For this sake the algorithm used to select an automatic fly-out path in a direction selected by maximising the distance between own and other aircraft automatic fly-outs requires a lot of computer capacity, so that it is not, at least at present, possible to have such a system switched on other than under very special circumstances.

The function of the means determining a risk of crossing of predicted flight paths and delivering an alert for avoiding a later collision is very important for safety reasons. However, this so-called de-conflicting system is in conflict with the purpose of air combat training sessions of aircraft, since this de-conflicting system will then continuously warn an aircraft, and when manned the pilot, of other approaching aircraft. This means that it is not possible to train the aircraft and/or pilot to handle difficult situations suddenly occurring as a surprise and requiring instantaneous actions. To the contrary, the pilot will well in advance always be aware of the position of threatening aircraft approaching.

SUMMARY OF THE INVENTION

The object of the present invention is to provide a station and a method of the type defined in the introduction solving the problem mentioned above.

This object is according to the invention obtained by providing such a station with means adapted to receive and store information about geometrical dimensions and time of appearance and disappearance of at least one predefined first airspace volume as well as a list of aircraft of a predefined identity, and an arrangement adapted to determine whether the aircraft carrying said station is within said airspace volume or not, by comparing the information about said airspace volume with the position of the aircraft, and make the function of said warning means dependent upon this comparison by, when located in said airspace volume, deactivating said warning means with respect to other aircraft of said predefined identity, and when not located in said airspace volume, activate or keep the function of said warning means activated with respect to aircraft of said predefined identity, as well as a method according to the appended independent method claim.

This means that a military exercise in the form of an air combat being very realistic may be trained within said first airspace volume, since when the aircraft is within said airspace volume approaching aircraft being on said list of aircraft of predefined identity, i.e. normally the aircraft participating in the exercise, will not result in any alert making the aircraft aware of the approaching. Thus, such an aircraft has the possibility to come very close to this aircraft without being detected by controlling the aircraft with skill and cunning. However, when the aircraft of said predefined identity are outside said airspace volume in their flight thereto or therefrom it is important that they have an early warning of risks for mid-air collisions with other aircraft, which is ensured by having a so-called de-conflicting system active outside said airspace volume. "Active" does in this context mean that the warning means may deliver an alert when the conditions therefor are fulfilled and "deactivated" that it may not, even if such conditions are fulfilled, deliver any alert.

The airspace volume may for example have a horizontal area of a couple of hundred $km^2$ and a height of for example 2000 meters. It does only exist during a predefined period of time, for example 9.30-10.00 on Sep. 16, 2004. This information about said airspace volume as well as the list of aircraft of a said predefined identity may be transferred to a computer of the aircraft in several ways. It may be possible to introduce these data separately in each individual aircraft in question through an individual onboard panel or the like, but it is also conceivable and probably mostly most convenient to plan the entire exercise by using equipment therefor, such as a so-called Mission Support System (MSS) on an air base station and then transfer the data to the different aircraft by using a Data Transfer Unit (DTU). However, any way to provide the aircraft with these data is within the scope of the invention, such as through radio communication. It is even possible to provide the station of the aircraft with these data during flight. Several such airspace volumes may exist during one day, and also more than one at a time.

It is stressed that it may also be interesting to "switch off" the so-called de-conflicting system for other aircraft than manned military aircraft for testing purposes. For instance the behaviour of an unmanned combat vehicle may be examined and developed in this way. Another possibility is to test an automatic collision avoiding system for such air vehicles.

According to an embodiment of the present invention said warning means is adapted to be active for other aircraft than those of said predefined identity when determined by said arrangement that the station is within said airspace volume. The aircraft is in this way warned of approaching aircraft not participating in the exercise and which should possibly not be there, so that the presence thereof may be considered and any risk of collision or even coming close to such an aircraft may be avoided.

According to another embodiment of the invention said storing means is adapted to store information about a shell-like second airspace volume surrounding said first airspace volume and having an outer border at a substantial distance from the outer border of said first airspace volume and the same time of appearance and disappearance as the first airspace volume, the station comprises means adapted to deliver an alert when it is established that another aircraft than those of said predefined identity enters the second airspace volume, and said transmitter is adapted to then send an alert to said other aircraft. The aircraft with the station according to the invention will in this way be warned of other such aircraft well in advance, i.e. when such another aircraft is at a distance from the aircraft of at least said substantial distance between the borders of the two volumes, and may take suitable measures. Said other aircraft will at the same time be warned of the aircraft within said volume and possibly change the flight path. “Send an alert to” is here to interpreted broadly and also include the case in which an alert is delivered in said other aircraft as a consequence of information received from or about the aircraft within the first airspace volume.

According to another embodiment of the invention the station comprises means adapted to deliver an alert when the aircraft leaves said first airspace volume. The aircraft or the pilot thereof is in this way made aware of that he is not any longer within the airspace volume and accordingly does not comply with a flight permission given to him.

According to another embodiment of the invention said arrangement is adapted to carry out said deactivation of the warning means by switching off said determination function of said processing means for aircraft of said predefined identity. However, should such a switching off for any reason not be possible or allowed the arrangement is according to another embodiment instead adapted to obtain said deactivation of the warning means by preventing the warning means from delivering an alert for aircraft of said predefined identity in spite of a collision risk determined by said processing means. Accordingly, in such a case only the alerting part of the de-conflicting system is deactivated.

The station may also have an automatic collision avoiding system as defined above, and in one embodiment the station comprises control means adapted to activate said automatic collision avoiding system upon determination by said arrangement that the aircraft enters said first airspace volume. By having this automatic collision avoiding system active when the so-called de-conflicting system is deactivated for the aircraft of said predefined identity these aircraft may come very close to each other and practice an air-air combat training fight being realistic without any risk of collision. When at the same time the system control means is adapted to deactivate said automatic collision avoiding system upon determination by said arrangement that the aircraft is leaving said first airspace volume it is ensured that this automatic collision avoiding system is not active when it is not needed, which may be of importance as a consequence of the huge computer capacity normally required by such a system.

According to another embodiment of the invention said system control means is coordinated with the control of said warning means so that deactivation of said warning means with respect to aircraft of said predefined identity results in an activation of said automatic collision avoiding system and an activation of said warning means with respect to these aircraft results in a deactivation of said automatic collision avoiding system. Such coordination ensures that the automatic collision avoiding system will always be active when said warning means are deactivated and that the automatic collision avoiding system always will be switched off when the warning means are active.

According to another embodiment of the invention said storing means is able to add aircraft to the list of said aircraft of said predefined identity during the flight of said aircraft. This offers the possibility to include further aircraft in an exercise just before or during the very exercise.

According to another embodiment of the invention said first airspace volume is provided with a channel-like passage for allowing aircraft being not of said predefined identity to pass therethrough without delivering any alert by said warning means. This embodiment indicates that the shape of said first airspace volume may be arbitrary, and it may for instance have an opening or passage for allowing other aircraft, such as civilian aircraft, to pass the region in which the airspace volume is located even if this airspace volume should be comparatively large.

The invention also relates to a method for assisting the control of an aircraft and embodiments thereof according to the appended method claims. The features and advantages thereof appear clearly from the discussion above of different embodiments of the station according to the invention.

The method according to the invention is well suited to be carried out by a computer, and the invention therefore also relates to a computer program as well as a computer readable medium according to the appended claims therefor.

BRIEF DESCRIPTION OF THE DRAWINGS

With reference to the appended drawings, below follows a specific description of embodiments of the invention cited as examples.

In the drawings.

DETAILED DESCRIPTION OF EMBODIMENTS OF THE INVENTION

Figure 1:
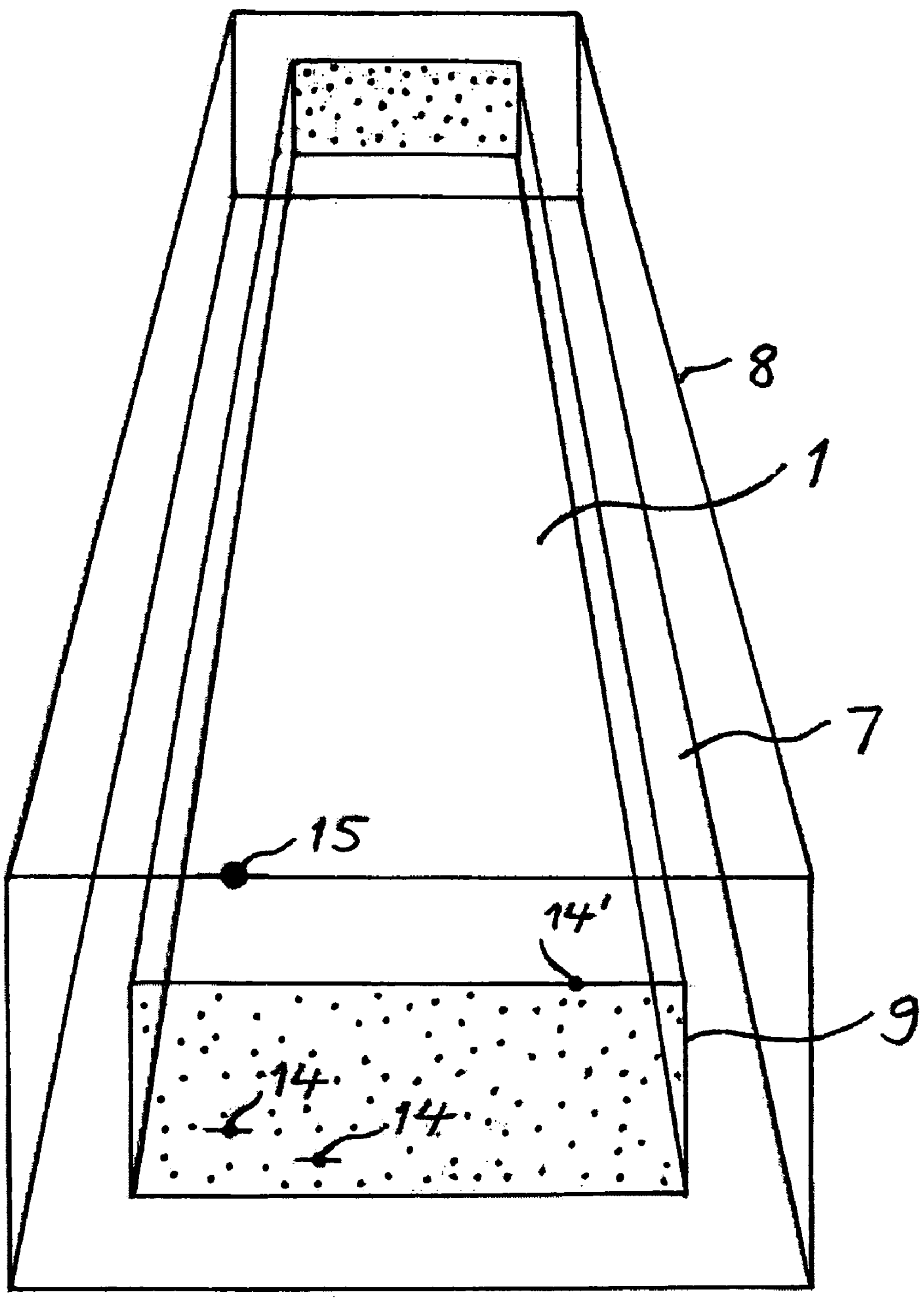
FIGS. 1 and 2 are schematical views of a part of the airspace used to explain two embodiments of the present invention.

An embodiment of the present invention will now be explained while making reference to FIGS. 1 and 3 simultaneously. It is pointed out that the relative dimensions of the objects shown in FIGS. 1 and 2 may not be realistic but are used for illustrative purposes.

An inner first airspace volume 1 is here a parallel epiped defined by the coordinates (latitude, longitude and altitude) of its eight corners as well as the time of appearance and disappearance thereof. Accordingly, this volume only exists during a certain period of time. This first airspace volume may have any shape and dimensions, and it has for instance a length of 20 km, a width of 10 km and a height of 2000 meters, and it may be located at a suitable altitude, for instance directly above the ground or several thousands of meters thereabove.

The information about this first airspace volume is introduced and stored in the on board computer of an aircraft provided with a station for assisting the control of an aircraft according to the invention. This is done together with a list of aircraft of a predefined identity, with respect to which the aircraft is intended to behave in a way to be explained further below. These data may be brought into the computer of the aircraft in different ways. Only some of them will be mentioned here. The data may be introduced into the computer through a panel on board of the aircraft in question. These data may also be introduced in a mission support system on an air base station, where a flight and an exercise are planned, and the data may then through the use of a data transfer unit (DTU) be transferred to the different aircraft. A combination of these two methods is also possible. The data may also be transferred through digital radio communication to the aircraft computer from said mission support system or from other aircraft.

An aircraft provided with the station according to the invention has a transmitter 2 adapted to broadcast data associated with the position, the velocity and the identity of the aircraft, and a receiver 3 adapted to receive data associated with the position, the velocity and the identity from such stations of other aircraft. It further comprises a deconflicting system including processing means 4 adapted to determine, based on said data broadcasted and received, whether there is a risk that the predicted flight trajectory of the aircraft cross any predicted flight path of a said other aircraft, and if so control warning means 5 to deliver an alert for avoiding a later collision.

The station also comprises means 25 adapted to receive and store information about geometrical dimensions and time of appearance and disappearance of said first airspace volume and said list of aircraft of a predefined identity. An arrangement 6 is adapted to determine whether the aircraft carrying said station is within said airspace volume or not, by comparing the information about said airspace volume with the position of the aircraft, and make the function of said warning means 5 dependent upon this comparison by, when located in said airspace volume, deactivating said warning means with respect to other aircraft of said predefined identity, and when not located in said airspace volume, activate or keep the function of said warning means activated with respect to aircraft of said predefined identity. In this case the warning means is adapted to be active for other aircraft than those of said predefined identity when determined by said arrangement that the station is within said airspace volume.

The storing means 25 is also adapted to store information about a shell-like second airspace volume 7 surrounding said first airspace volume 1 and having an outer border 8 at a substantial distance from the outer border 9 of said first airspace volume and the same time of appearance and disappearance as the first airspace volume. Means 10 are adapted to deliver an alert when it is established that another aircraft than those of said predefined identity enters the second airspace volume, and it is ensured that this other aircraft also receive an alert when this takes place. This second airspace volume defines a no man's land, since otherwise an incoming aircraft not of said predefined identity, such as a civilian aircraft, may come very close to the aircraft within the first airspace volume before alerts are delivered when this aircraft flies very close to the border 9 of this first airspace volume. Thus, such a no man's land introduce a safe distance.

The station also comprises means 11 adapted to deliver an alert when the aircraft leaves said first airspace volume 1.

The station also comprises an automatic collision avoiding system 12 adapted to select an automatic so-called fly-out of the aircraft for avoiding a collision with another aircraft coming close thereto. Control means 13 are adapted to activate said automatic collision avoiding system 12 upon determination by said arrangement that the aircraft enters said first airspace volume and deactivate it when the aircraft is leaving this volume.

Furthermore, the storing means 25 is able to add aircraft to the list of said aircraft of said predefined identity during the flight of said aircraft, so that further aircraft may be included in an air-air combat training fight. Such a training fight may have been planned for a group of aircraft, for instance five such aircraft, and another military aircraft is approaching and wish to also participate in the training session. This may then be accomplished by adding it to the list in this way.

The function of the station according to the invention and thus the method according to the invention will now be further explained while making reference to FIG. 1. It is shown how aircraft of said predefined identity 14 are within said first airspace volume 1, so that they have said warning means 5 deactivated with respect to each other but the automatic collision avoiding system activated. This means that they can fly very close to each other without being warned through said warning means of the mutual existence.

Another aircraft 14' of said predefined identity is crossing the border of said first airspace volume 1, and when this is entering this airspace volume said warning means will be deactivated with respect to the aircraft 14 and the automatic collision avoiding system activated. However, if this aircraft 14' is leaving the airspace volume 1 an alert is delivered, so that the pilot becomes aware of this fact and that he has to try to enter the volume again. At the same time said warning means is activated with respect to aircraft on said list.

A civilian aircraft 15, i.e. an unwanted aircraft that shall not participate in the exercise, cross the outer border 8 of the second airspace volume 7, which delivers an alert in the stations of the aircraft 14 and 14' as well as in the aircraft 15, so that the aircraft 15 should change its flight path and avoid coming into the inner space 1. Shouldn't this be possible due to a fault in the aircraft 15 the aircraft 14 and 14' will be aware of this aircraft 15 and may avoid a collision therewith.

Figure 2:
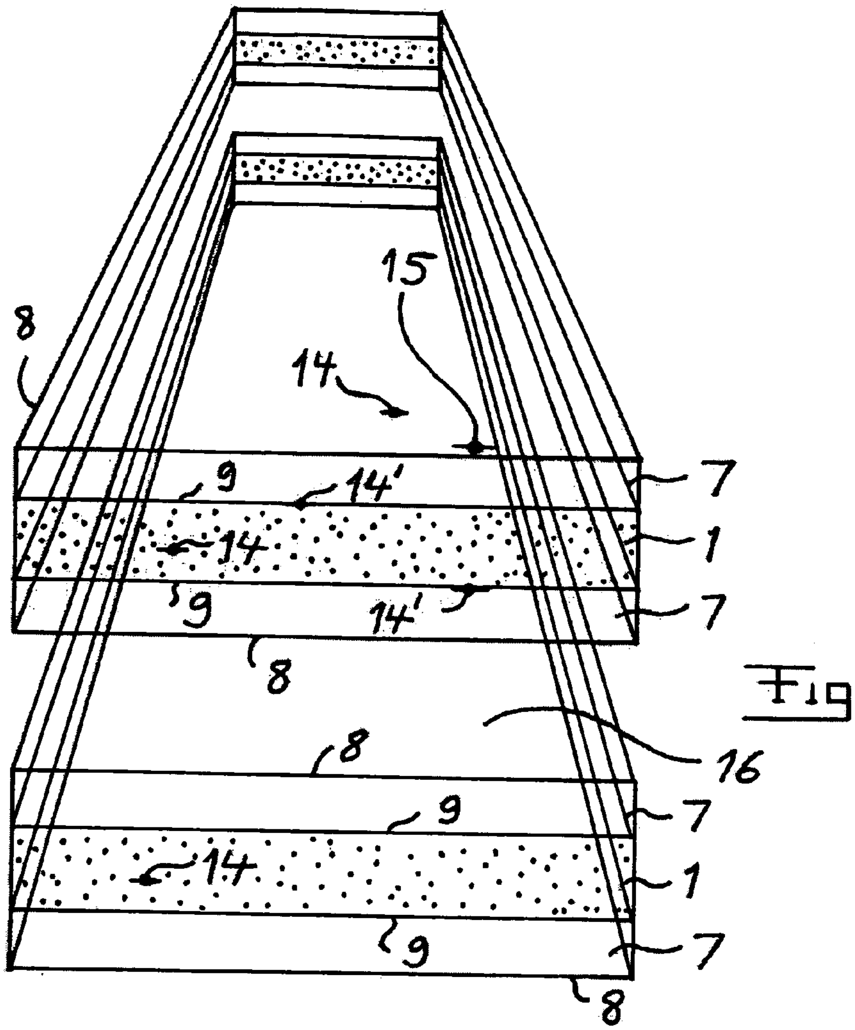
Figure 3:
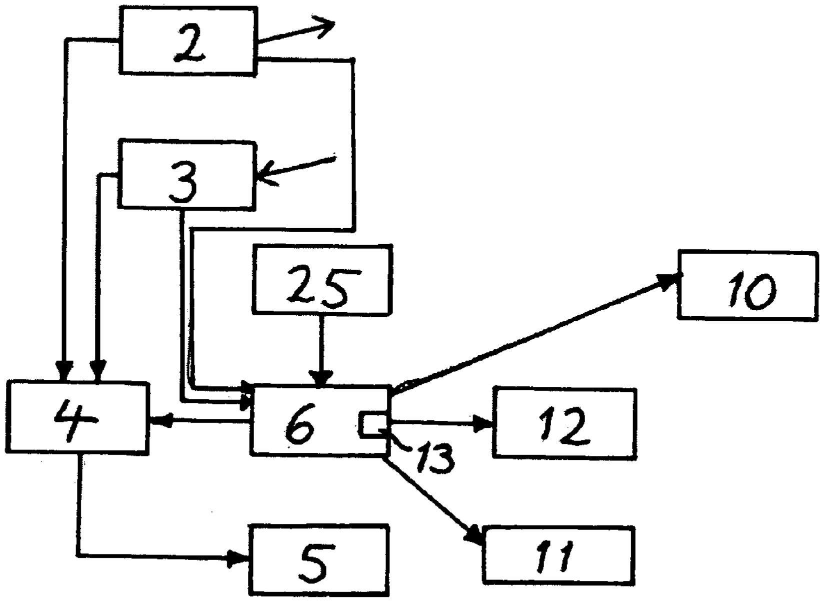
FIG. 3 is block diagram used to explain the method according to the invention and how a station according to the invention may work.

It is illustrated in FIG. 2 that the first airspace volume 1 may have another shape and also have a channel-like passage 16 for letting aircraft not being of said predefined identity pass the airspace volume. In this case said second airspace volume 7 forms the inner wall of said passage.

The invention is of course not in any way restricted to the embodiments described above but many possibilities to modifications thereof would be apparent to a person with ordinary skill in the art without departing from the basic idea of the invention as defined in the appended claims.

The invention also covers stations having no automatic collision avoiding system, and also such ones with such a system being active all the time, although this would require a lot of computer capacity. However, this may then ensure that no collision takes place even if a pilot loses the consciousness.

It is pointed out that "alert" as used in this disclosure may be any type of warning signal which may differ depending upon the type of aircraft or vehicle concerned. Such a warning signal may for instance for an unmanned vehicle be a simple transfer of a message to the on board computer that there is a risk of collision, so that this may then control the vehicle accordingly. It may also, in a manned aircraft, for example be a visual and/or audible signal for the pilot. The alerts of different members of a station according to the invention may also for the same vehicle have different characters.

What is claimed is:

1. A method for assisting the control of an aircraft participating in an exercise with other aircraft of predefined identity comprising the steps:

broadcasting data associated with the position, the velocity and the identity of said aircraft, receiving data associated with the position, the velocity and the identity of other aircraft, processing said data broadcasted and received for determining whether there is a risk that the predicted flight trajectory of the aircraft cross any predicted flight path of a said other aircraft, and if so delivering an alert for avoiding a later collision, wherein it also comprises the steps of:

determining whether the aircraft is within a predefined first airspace volume (1) or not, said airspace volume being defined by geometrical dimensions and time of appearance and disappearance, by comparing information about said airspace volume with the position of the aircraft, making said delivering of an alert dependent upon this comparison by, when located in said airspace volume, not delivering any said alert with respect to other aircraft of said predefined identity, and when not located in said airspace volume, allowing said delivering of an alert with respect to aircraft of said predefined identity.

2. A method according to claim 1, wherein said delivering of an alert is allowed for other aircraft than those of said predefined identity when determined that the aircraft is within said airspace volume (1).

3. A method according to claim 1, wherein it comprises storing of information about a shell-like second airspace volume (7) surrounding said first airspace volume (1) and having an outer border (8) at a substantial distance from the outer border (9) of said first airspace volume and the same time of appearance and disappearance as the first airspace volume, that an alert is delivered when it is established that another aircraft than those of said predefined identity enters the second airspace volume, and that an alert is then sent to/created in said other aircraft.

4. A method according to claim 1, wherein an alert is delivered when the aircraft leaves said first airspace volume (1).

5. A method according to claim 1, wherein the control to not deliver any alert for avoiding a later collision as a consequence of said comparison is carried out by cancelling the collision risk determination through said processing for aircraft of said predefined identity.

6. A method according to claim 1, wherein the control to not deliver any alert for avoiding a later collision as a consequence of said comparison is carried out by preventing the delivering of an alert for aircraft of said predefined identity in spite of a determination of a collision risk through said processing.

7. A method according to claim 1, wherein it is carried out for an aircraft comprising an automatic collision avoiding system (12) adapted to select an automatic so-called fly-out of the aircraft for avoiding a collision with another aircraft coming close thereto, and that said automatic collision avoiding system is activated upon said determination that the aircraft enters said first airspace volume (1).

8. A method according to claim 7, wherein said automatic collision avoiding system (12) is deactivated upon determining that the aircraft is leaving said first airspace volume (1).

9. A method according to claim 7, wherein the control for deactivating said delivering of an alert for avoiding a later collision with respect to aircraft of said predefined identity is coordinated with the control of said automatic collision avoiding system (12) for then activating said automatic collision avoiding system and activate said alert delivering for avoiding a later collision with respect to these aircraft together with a deactivation of said automatic collision avoiding system.

10. A method according to claim 1, wherein aircraft are added to a list of said aircraft of said predefined identity during the flight of said aircraft.

11. A method according to claim 1, wherein it is carried out for a said first airspace volume (1) provided with a channel-like passage (16) for allowing aircraft being not of said predefined identity to pass therethrough without any said delivering of an alert for avoiding a later collision.

12. A computer program directly loadable into the internal memory of a digital computer, comprising program code for assisting the control of an aircraft participating in an exercise with other aircraft of predefined identity, wherein the program code comprises sets of instructions for:

broadcasting data associated with the position, the velocity and the identity of said aircraft;

receiving data associated with the position, the velocity and the identity of other aircraft;

processing said data broadcasted and received for determining whether there is a risk that the predicted flight trajectory of the aircraft cross any predicted flight path of a said other aircraft, and if so delivering an alert for avoiding a later collision;

determining whether the aircraft is within a predefined first airspace volume (1) or not, said airspace volume being defined by geometrical dimensions and time of appearance and disappearance, by comparing information about said airspace volume with the position of the aircraft; and making said delivering of an alert dependent upon this comparison by, when located in said airspace volume, not delivering any said alert with respect to other aircraft of said predefined identity, and when not located in said airspace volume, allowing said delivering of an alert with respect to aircraft of said predefined identity.

13. A computer program product in a computer readable medium having computer program code recorded thereon, wherein the program code includes sets of instructions comprising:

first computer instructions for broadcasting data associated with the position, the velocity and the identity of said aircraft;

second computer instructions for receiving data associated with the position, the velocity and the identity of other aircraft;

third computer instructions for processing said data broadcasted and received for determining whether there is a risk that the predicted flight trajectory of the aircraft cross any predicted flight path of a said other aircraft, and if so delivering an alert for avoiding a later collision;

fourth computer instructions for determining whether the aircraft is within a predefined first airspace volume (1) or not, said airspace volume being defined by geometrical dimensions and time of appearance and disappearance, by comparing information about said airspace volume with the position of the aircraft; and fifth computer instructions for making said delivering of an alert dependent upon this comparison by, when located in said airspace volume, not delivering any said alert with respect to other aircraft of said predefined identity, and when not located in said airspace volume, allowing said delivering of an alert with respect to aircraft of said predefined identity.

14. A station for assisting the control of an aircraft, said station being adapted to be arranged in said aircraft (14) and comprising:

a transmitter (2) adapted to broadcast data associated with the position, the velocity and the identity of said aircraft, a receiver (3) adapted to receive data associated with the position, the velocity and the identity from such stations of other aircraft, processing means (4) adapted to determine, based on said data broadcasted and received, whether there is a risk that the predicted flight trajectory of the aircraft cross any predicted flight path of a said other aircraft, and if so control warning means (5) to deliver an alert for avoiding a later collision, wherein the station also comprises, means (25) adapted to receive and store information about geometrical dimensions and time of appearance and disappearance of at least one predefined first airspace volume (1) as well as a list of aircraft of a predefined identity, and an arrangement (6) adapted to determine whether the aircraft carrying said station is within said airspace volume or not, by comparing the information about said airspace volume with the position of the aircraft, and make the function of said warning means (5) dependent upon this comparison by, when located in said airspace volume, deactivating said warning means with respect to other aircraft of said predefined identity, and when not located in said airspace volume, activate or keep the function of said warning means activated with respect to aircraft of said predefined identity.

15. A station according to claim 14, wherein said warning means (5) is adapted to be active for other aircraft than those of said predefined identity when determined by said arrangement (6) that the station is within said airspace volume (1).

16. A station according to claim 14, wherein said storing means (25) is adapted to store information about a shell-like second airspace volume (7) surrounding said first airspace volume (1) and having an outer border (8) at a substantial distance from the outer border (9) of said first airspace volume and the same time of appearance and disappearance as the first airspace volume, that the station comprises means (10) adapted to deliver an alert when it is established that another aircraft than those of said predefined identity enters the second airspace volume (7), and that said transmitter (2) is adapted to then send an alert to said other aircraft.

17. A station according to claim 14, wherein it comprises means (11) adapted to deliver an alert when the aircraft leaves said first airspace volume (1).

18. A station according to claim 14, wherein said arrangement (6) is adapted to carry out said deactivation of the warning means (5) by switching off said determination function of said processing means (4) for aircraft of said predefined identity.

19. A station according claim 14, wherein said arrangement (6) is adapted to obtain said deactivation of the warning means (5) by preventing the warning means from delivering an alert for aircraft of said predefined identity in spite of a collision risk determined by said processing means (4).

20. A station according to claim 14, wherein it also comprises an automatic collision avoiding system (12) adapted to select an automatic so-called fly-out of the aircraft for avoiding a collision with another aircraft coming close thereto, and that it comprises control means (13) adapted to activate said automatic collision avoiding system upon determination by said arrangement that the aircraft enters said first airspace volume (1).

21. A station according to claim 20, wherein said system control means (13) is adapted to deactivate said automatic collision avoiding system (12) upon determination by said arrangement (6) that the aircraft is leaving said first airspace volume (1).

22. A station according to claim 20, wherein said system control means (13) is coordinated with the control of said warning means (5) so that deactivation of said warning means with respect to aircraft of said predefined identity results in an activation of said automatic collision avoiding system (12) and an activation of said warning means with respect to these aircraft results in a deactivation of said automatic collision avoiding system.

23. A station according to any of claim 14, wherein that it also comprises an automatic collision avoiding system (12) adapted to select an automatic so-called fly-out of the aircraft for avoiding a collision with another aircraft coming close thereto, and this automatic collision avoiding system is adapted to be continuously active when the aircraft is in the air.

24. A station according to claim 14, wherein said storing means (25) is able to add aircraft to the list of said aircraft of said predefined identity during the flight of said aircraft.

25. A station according to claim 14, wherein that said first airspace volume (1) is provided with a channel-like passage (16) for allowing aircraft being not of said predefined identity to pass therethrough without delivering any alert by said warning means (5).

26. A station according to claim 14, wherein said station is adapted to be arranged in an aircraft (14) in the form of a manned aircraft, especially a military aircraft, an unmanned air vehicle or an unmanned combat vehicle.

* * * * *